May 24, 1966  G. KIPER  3,252,395
PHOTOGRAPHIC SHUTTER
Filed Dec. 11, 1963
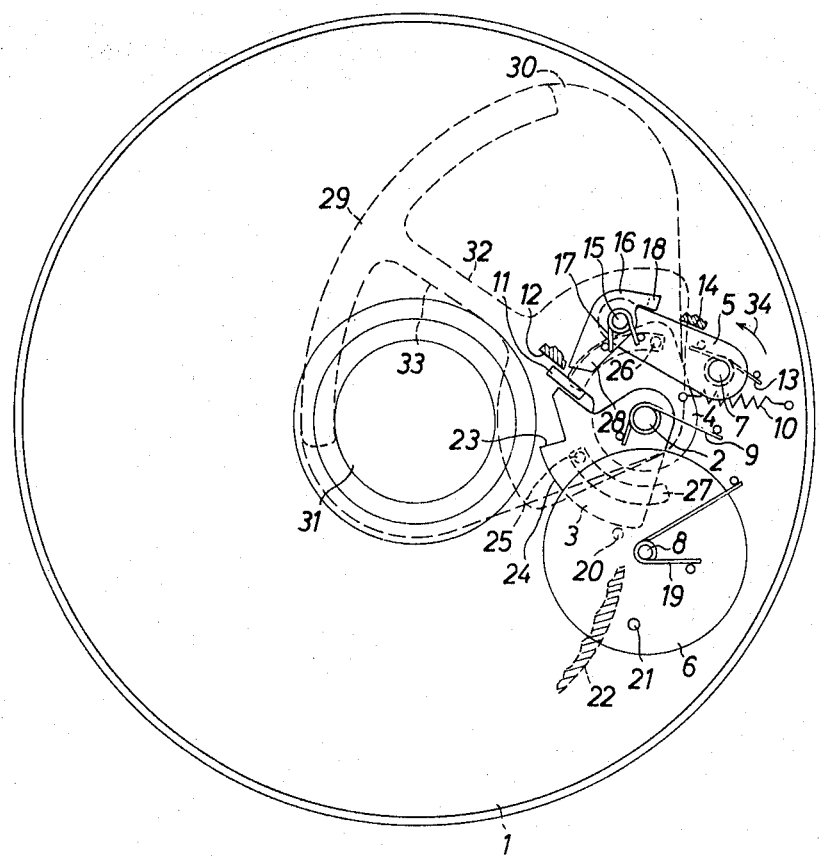
INVENTOR.
GERD KIPER
BY
Michael S. Striker
Atty 3,252,395
PHOTOGRAPHIC SHUTTER
Gerd Kiper, Unterhaching, Munich, Germany, assignor to Agfa Aktiengesellschaft, Leverkusen, Germany
Filed Dec. 11, 1963, Ser. No. 329,737
Claims priority, application Germany, Dec. 19, 1962,
A 41,925
14 Claims. (Cl. 95—60)

The present invention relates to cameras.

More particularly, the present invention relates to photographic shutters.

At the present time there are known photographic shutters which include blade assemblies which turn as a unit from their rest to their cocked position so as to prevent an exposure from being made at this time, and these assemblies include leading and trailing parts which operate to make an exposure by causing the leading part or parts to turn in advance of the trailing parts back to the rest position so that the movement of the leading parts with respect to the trailing parts places the blade assembly in a position uncovering the exposure aperture, and a retarding means prevents the rotation of the trailing part or parts to an extent which determines the exposure time.

While such shutters are widely used they suffer from several drawbacks. In the first place, they are relatively complex, often requiring a set of blades to be actuated by leading and trailing shutter rings, so that the assembly is quite expansive and must be very precisely manufactured. Also, structures are known where the blade movement is controlled by linkages, but here again the parts must be very accurately manufactured so that a considerable cost is involved. Moreover, with structures of the above type the mass of the parts is so great that it is not possible to provide extremely short exposure times, and in fact, in some constructions it is not possible to precisely determine the exposure time because the duration of the exposure is determined in a purely manual manner.

It is accordingly a primary object of the present invention to simplify shutters of the above type in a manner which will on one hand greatly reduce the cost of manufacture and which will on the other hand enable extremely short exposure times to be provided.

Also, it is an object of the present invention to provide a structure of the above type which enables precisely determined exposure times to be preselected.

Furthermore, it is an object of the present invention to provide shutter assemblies of the above type which make it possible for the shutter blades themselves to be thin and stressed to such a small extent that relatively weak materials which heretofore could not be used for shutter blades can now be safely used for this purpose.

With the above objects in view, the invention includes, in a camera, a support means and a leading shutter blade and a trailing shutter blade turnably carried by the support means for rotation about a common axis. Leading and trailing levers are also carried by the support means for turning movement about this common axis and the leading and trailing levers are respectively connected with the leading and trailing blades to turn the latter at all times with the levers. A pair of spring means respectively urge the blades from a cocked position where they overlap each other back to a rest position where they also overlap each other, and a manually operable means cooperates with the levers for turning the latter and the blades therewith as a unit to displace the blades from their rest to their cocked position while maintaining their overlapping relationship so that an exposure aperture of the camera which is covered by the blades when the latter are in their rest position will remain covered by the blades during displacement thereof to their cocked position. A retarding means operatively engages only the trailing lever when the leading lever and the leading blade therewith return to their rest position so that the aperture will be uncovered until the retarding means, which determines the exposure time, releases the trailing blade and lever for return to the rest position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which one possible embodiment of a structure according to the present invention is illustrated in a partly diagrammatic manner in a plane which is normal to the optical axis.

Referring now to the drawing, there is diagrammatically illustrated therein a shutter assembly which includes a transverse supporting wall 1 which forms part of the support means and which in a well known manner forms part of an object assembly of a camera. The shutter is shown in the drawing in its rest position and includes shutter blades 29 and 30 which are located at the side of the support means 1 which is not visible in the drawing. These shutter blades 29 and 30 are supported by a single pivot pin 2 for turning movement about a common axis, this pivot pin 2 being fixedly carried by the plate 1, forming therewith part of the support means, and having an axis which is parallel to the optical axis which passes through the center of the aperture 31 of the objective. At the side of the support plate 1 which is visible in the drawing are located a pair of levers 3 and 4 which are also supported for turning movement by the same pivot pin 2, so that both of the shutter blades and both of the levers 3 and 4 all have a common turning axis, in accordance with the present invention. As will be apparent from the description which follows the blade 30 is a leading shutter blade and the lever 4 is a leading lever connected to the blade 30 to turn the latter together with the lever 4, while the blade 29 is a trailing shutter blade and the lever 3 is a trailing lever which is connected to the blade 29 to turn the latter with the trailing lever 3. A connecting means connects the leading lever 4 and the leading blade 30 to each other for turning movement together, and in the illustrated example this connecting means takes the form of a pin 26 which is fixed to the lever 4 for turning movement therewith and which extends into a circular opening of the blade 30, filling this opening, so that in this simple way the lever 4 and blade 30 are connected to each other to turn together, and the plate 1 is formed with an arcuate slot 28 located along a circle whose center is in the axis of the pin 2 so that the pin 26 can move along this slot while the leading lever 4 and blade 30 turn as a unit with the plate 1 situated therebetween. In the same way the connecting means between the trailing lever 3 and the trailing blade 29 includes a pin 25 fixed to a portion of the lever 3 and extending through and filling a circular opening of the blade 29, and the plate 1 is formed with a slot 27 extending along a circle whose center is in the axis of the pin 2, and the pin 25 extends through the slot 27 and is movable therealong during turning of the trailing blade 29 and lever 3 therewith. The blades 29 and 30 are shown in a rest position where the blade 29 covers the aperture 31 and it will be noted that the edge portion 32 at the inner end of a notch formed in the blade 29 overlaps the edge portion 33 at the inner end of a notch formed in the blade 30, so that in this way the blades 29 and 30 have an overlapping relation with respect to each other in their illustrated rest position.

A manually operable means is provided for cooperating with the levers to turn the blades from their illustrated rest position in a counterclockwise direction about the pivot pin 2 to a cocked position where the pins 25 and 26 are respectively situated adjacent the opposite ends of the slots 27 and 28, respectively, and this manually operable means includes a lever 5 supported for turning movement by a pivot pin 7 fixedly carried by the plate 1 and forming part of the support means, and any suitable unillustrated lever is connected to the lever and is accessible at the exterior of the objective assembly to enable the operator to turn the lever 5 in the direction of the arrow 34 about the pin 7 when it is desired to cock the shutter.

The structure also includes a retarding means which retards only the return of the trailing blade 29 from its cocked to its rest position, as will be apparent from the description below, and this retarding means includes a rotary mass 6 supported by a pivot pin 8 for free turning movement, this pivot pin 8 also being fixedly carried by the plate 1 and forming part of the support means.

A pair of spring means respectively urge the blades 29 and 30 to their illustrated rest position and this pair of spring means includes the spring 9 which is coiled about the pin 2 and has a pair of free ends engaging a stationary pin carried by the plate 1 and a pin carried by the lever 3, so that the spring 9 urges the lever 3, and of course, the blade 29 therewith, in a clockwise direction, as viewed in the drawing. The other spring means is formed by a spring 10 which is in the illustrated example an elongated coil spring one end of which is connected to a stationary pin carried by the plate 1 and the other end of which is connected to a pin fixed to the leading lever 4, the spring 10 being under tension and urging the lever 4 also in a clockwise direction, as viewed in the drawing.

The above referred-to manually operable means which includes the lever 5 includes also a lug 11 fixed to and projecting from the lever 4 and engaging in the illustrated position of the parts a stationary stop member 12 which is diagrammatically illustrated and which is carried by the plate 1, for example. Thus, the cooperation between the lug 11 and the stop 12 limits the clockwise turning of the lever 4 and the blade 30 by the spring 10 to the illustrated position. A spring 13 is coiled about the pin 7 and has a pair of free ends respectively engaging a stationary pin carried by the plate 1 and a pin carried by the lever 5 so that the spring 13 urges the lever 5 in a clockwise direction, and this turning of the lever 5 by the spring 13 is limited by a stop member 14 against which the lever 5 is held by the spring 13 in the illustrated position of the parts, this stop member 14 also being fixedly carried by any stationary member such as the wall 1. The manually operable means further includes a swing-lever 16 pivotally connected at 15 to the lever 5 at an end portion thereof distant from the pin 7, and a spring 17 is coiled about the pin 15 and has a pair of free ends respectively engaging a pair of pins which are respectively carried by the swing-lever 16 of the manually operable means and the lever 5 thereof, so that the spring 17 urges the swing-lever 16 to turn in a clockwise direction about the pin 15 with respect to the lever 5, as viewed in the drawing, and this turning of the swing-lever 16 is limited by engagement of a rearwardly directed lug 18 at an end of the lever 16 which engages an edge of the lever 5, as illustrated. Thus, the lever 16 cannot turn in a clockwise direction with respect to the lever 5 beyond the illustrated position but on the other hand is free to turn in opposition to the spring 17 in a counterclockwise direction.

The retarding means includes in addition to the rotary mass 6, a spring 19 coiled about the pin 8 and having free ends which respectively engages a stationary pin carried by the plate 1 and a pin carried by the mass 6 so that the spring 19 urges the mass 6 to turn in a clockwise direction, as viewed in the drawing, and in addition the retarding means includes a pin 20 fixed to the rotary mass 6 and extending through the plane in which the trailing lever 3 is located, the spring 19, urging, through the mass 6, the pin 20 against the arcuate peripheral edge 24 of the lever 3, this edge 24 extending along a circle whose center is in the axis of the pin 2, and at its left end, as viewed in the drawing, the curved edge 24 adjoins a shoulder 23 which extends substantially radially toward the turning axis of the lever 3 and which cooperates with the pin 20 in a manner described below to form part of the retarding means. In order to selectively adjust the exposure time, there is an adjustable cam 22 of a known structure and capable of being manually adjustable by the operator of the camera in a manner well known in the art when selecting the exposure time, and this adjustment will control the distance between the pin 21 which is carried by the rotary mass 6 and the cam 22. In other words, the configuration of the cam 22 is such that depending upon the selected adjustment thereof the pin 21 will have to turn through a greater or lesser distance with the mass 6 before engaging the cam 22, and it is this adjustment which determines the exposure time.

In order to displace the blades 29 and 30 from their illustrated rest position to their cocked position, the operator will turn the lever 5 in the direction of the arrow 34 in opposition to the spring 13 and the tip of the swing-lever 16 will engage the lug 11 to displace the latter with the lever 4 and the blade 30 in opposition to the spring 10 in a counterclockwise direction about the pin 2, and a portion of the lever 3 is directly engaged by the lug 11 so that the turning of the lever 4 is also transmitted to the lever 3 and thus the trailing blade 29 turns with the lever 3 and with the leading blade 30 as a unit so that in this way when the blades are displaced to their cocked position they remain in their illustrated overlapping relationship, do not move at all with respect to each other, and thus prevent the aperture 31 from becoming uncovered during cocking of the shutter. Of course, the spring 9 maintains the upper left free end portion of the lever 3, as viewed in the drawing, in engagement with the lug 11 at this time. During the cocking of the shutter the edge 24 of the trailing lever 3 will move along the pin 20 in a counterclockwise direction, and just before the blades reach their cocked position the left end of the edge 24 will move beyond the pin 20 and the spring 19 will turn the mass 6 in a clockwise direction until the pin 21 engages the cam 22, and the extent of turning of the pin 21 will determine the extent to which the pin 20 moves along the shoulder 23 just before the shutter blades reach their cocked position. Also, during approach of the blades to their cocked position the tip of the swing-lever 16 and the lug 11 shift laterally one with respect to the other with the lug 11 displacing itself to the left, as viewed in the drawing, with respect to the lever 16 while the lever 16 displaces itself to the right with respect to the lug 11, and precisely when the cocked position is reached the tip of the swing-lever 16 will ride off the lug 11 thus immediately releasing the leading blade means 30, 4 to the force of the spring means 10 which has been further tensioned during cocking of the shutter, so that at this instant the spring means 10 will immediately return the leading blade 30 to its rest position which is determined by engagement of the lug 11 with the stop 12. At this time, however, which is to say as soon as the cocked position of the blades has been reached, the trailing blade 29 will not be able to return to its rest position because of the cooperation of the retarding means with the trailing lever 3. In the cocked position the edge 32 of the trailing blade 29 has been displaced to a location below the aperture 31 so that when the leading blade 30 returns to its rest position the edge 33 thereof returns to the illustrated position and thus the notches of the blades form continuations of each other and the aperture 31 is uncovered so as to make an exposure. However, the spring 9 urges the trailing blade means 29, 3 to return to its illustrated rest position, and in order to do this the spring 9 is strong enough to cause the edge 23 of the lever 3 to displace the pin 20 outwardly away from the turning axis of the lever 3 along the shoulder 23 while opposing the force of the retarding mass 6 and the spring 19, and it will be seen that a greater or lesser time will be required for the pin 20 to reach the outer tip of the shoulder 23 depending upon the initial adjustment of the cam 22. In this way the exposure time is determined. As soon as the pin 20 reaches the outer tip of the shoulder 23 the trailing blade 29 and of course the trailing lever 3 therewith is rapidly swung by the spring 9 back to the illustrated rest position determined by engagement of the trailing lever 3 with the lug 11, and thus the aperture 31 is again closed. When the operator releases the lever 5 the spring 13 will return it to the illustrated position where it engages the stop member 14, and during this time the swing-lever 16 can engage the lug 11 and be turned thereby in a counterclockwise direction relative to the lever 5 during the clockwise return movement thereof until the lever 16 is displaced in a clockwise direction beyond the lug 11 whereupon the spring 17 returns the lever 16 to its illustrated position relative to the lever 5 where the lug 18 of the lever 16 engages the upper edge of the lever 5, as viewed in the drawing.

Of course, the invention is not necessarily limited to all of the above details. For example, a second manually operable lever and catch may be provided to releasably hold the parts in their cocked position until this lever is actuated to release the shutter blades for return in the above-described manner to their rest position, and thus the structure is easily adapted to that type of shutter where the operator can cock the shutter and leave it in its cocked position until it is desired to make an exposure. Moreover, any type of retarding mechanism may cooperate with the trailing blade means. The feature according to which the blades 29 and 30 on the one hand have a common turning axis and on the other hand do not have any type of pin-and-slot connection with the levers 3 and 4 which have the same turning axis as the blades 29 and 30 is particularly advantageous. The fact that there is no pin-and-slot connection between the levers and blades but instead a more or less rigid fixed connection therebetween enables the blades to be made of material of far less stiffness than is conventional, so that relatively light materials such as aluminum or plastic can now be used for the shutter blades. Of course, it is possible to form each blade and the lever connected thereto in one piece.

The stressing of the shutter blades with the structure of the invention is so small that it is possible to make these blades of relatively light materials of the type referred to above.

It will be understood that each of the elements described above, or two or more together, may also find a useful application in other types of cameras differing from the types described above.

While the invention has been illustrated and described as embodied in shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, support means; a pair of shutter blades carried by said support means for movement across the optical axis of the camera to cover and uncover an exposure aperture thereof, said shutter blades having a rest position where they overlap and close said aperture to prevent exposure, one of said shutter blades being a leading blade and the other being a trailing blade; second means operatively connected to said shutter blades for moving them as a unit from said rest position to a cocked position while maintaining said exposure aperture covered, said second means including blocking means associated with said trailing blade for movement together therewith, and for preventing movement of said trailing blade toward its rest position during movement of said blades to said cocked position thereof; a pair of spring means respectively connected operatively to said shutter blades for urging them to said rest position, said pair of spring means being tensioned during movement of said shutter blades by said second means from said rest to said cocked position, said blocking means being arranged to release said trailing blade to the action of the corresponding one of said pair of spring means for movement toward said rest position thereof simultaneously with release of said leading blade to the action of the other of said pair of spring means; and retarding means cooperating automatically only with said trailing blade when said blades are released by said second means for return by said pair of spring means to their rest position so that said leading blade is immediately returned to its rest position by the spring means operatively connected thereto while the return of said trailing blade to its rest position by the spring means operatively connected thereto is retarded by said retarding means to provide a given exposure time before said trailing blade returns to its rest position closing the aperture.

2. In a camera, in combination, support means; a pair of shutter blade means turnably carried by said support means for angular movement with respect to the optical axis between a rest position where an exposure aperture of the camera is closed and a cocked position where the aperture is also closed, said pair of blade means when in their rest position overlapping each other, one of said blade means being a leading blade means and the other of said blade means being a trailing blade means; a pair of spring means respectively connected operatively to said pair of blade means for urging the latter from said cocked to said rest position; second means operatively connected to said pair of blade means for turning the latter as a unit from said rest to said cocked position while tensioning said pair of spring means so that when released from said cocked position said pair of spring means will urge said pair of blade means back to said rest position thereof, said pair of blade means remaining in their overlapping relationship during movement to said cocked position to prevent said aperture from being uncovered, said second means including blocking means associated with said trailing blade for movement together therewith, and for preventing movement of said trailing blade towards its rest position during movement of said blades to said cocked position thereof, said blocking means being arranged to release said trailing blade to the action of the corresponding one of said pair of spring means for movement toward said rest position thereof simultaneously with release of said leading blade to the action of the other of said pair of spring means; and retarding means operatively connected only to said trailing blade means for retarding the return of said trailing blade means to said rest position while the spring means operatively connected to said leading blade means returns the latter immediately to its rest position so that a given exposure time is provided by said retarding means.

3. In a camera, in combination, support means; leading blade means and trailing blade means turnably carried by said support means for angular movement about a common axis parallel to the optical axis between a rest position where said leading and trailing blade means overlap and close an exposure aperture and a cocked position where said leading and trailing blade means still overlap and still close said aperture; a pair of spring means respectively connected operatively to said leading and trailing blade means for respectively urging the latter from said cocked to said rest position; actuating means operatively connected to said leading and trailing blade means for turning them as a unit from said rest to said cocked position while maintaining their overlapping relationship so that the aperture remains covered, said actuating means including blocking means associated with said trailing blade for movement together therewith, and for preventing movement of said trailing blade toward its rest position during movement of said blades to said cocked position thereof, said blocking means being arranged to release said trailing blade to the action of the corresponding one of said pair of spring means for movement toward said rest position thereof simultaneously with release of said leading blade to the action of the other of said pair of spring means; and retarding means automatically engaging only said trailing blade means when the latter is in said cocked position for retarding only the return of said trailing blade means to its rest position while said leading blade means is immediately returned by the spring means operatively connected thereto to its rest position to uncover said aperture for a given exposure time.

4. In a camera, in combination, support means; a leading blade turnably carried by said support means for turning movement about a given axis between a rest position and a cocked position; a leading lever also turnably carried by said support means for turning movement about said axis; connecting means connecting said leading lever and said leading blade to each other for movement together; a trailing blade also carried by said support means for turning movement about said axis and having a rest position overlapping said leading blade; a trailing lever also carried by said support means for turning movement about said axis; connecting means connecting said trailing lever and said trailing blade to each other for turning movement together; manually operable means operatively connected to said levers for turning them and said blades therewith as a unit from said rest positions of said blades to the cocked position of said leading blade while maintaining said trailing blade in its overlapping relation with respect to said leading blade and displacing said trailing blade also to a cocked position, the camera having an exposure aperture which is covered by at least one of said blades when they are in their rest positions and during movement thereof to said cocked positions, said manually operable means including blocking means associated with said trailing blade for movement together therewith, and for preventing movement of said trailing blade toward its rest position during movement of said blades to said cocked position thereof, a pair of spring means urging said blades to their rest positions, respectively, said blocking means being arranged to release said trailing blade to the action of the corresponding one of said pair of spring means for movement toward said rest position thereof simultaneously with release of said leading blade to the action of the other of said pair of spring means; and retarding means operatively engaging only said trailing lever for retarding the return thereof to said rest position while the spring means urging said leading blade immediately returns said leading blade to said rest position so that said leading blade will turn in advance of said trailing blade back to said rest position to uncover said aperture while said retarding means retards the return of said trailing blade to its rest position to provide a given exposure time.

5. In a camera as recited in claim 4, said connecting means which connects said leading lever and blade to each other including a portion of said leading blade and a portion of said leading lever aligned with said portion of said leading blade, and one of said portions being formed with an opening and the other of said portions fixedly carrying a pin which is located in and substantially fills said opening.

6. In a camera as recited in claim 4, the connecting means which connects said trailing lever and trailing blade to each other including a portion of said trailing blade and a portion of said trailing lever aligned with said portion of said trailing blade, and one of said portions being formed with an opening and the other of said portions fixedly carrying a pin which extends into and substantially fills said opening.

7. In a camera, in combination, support means; leading and trailing blades turnably carried by said support means for movement about a common axis between rest and cocked positions in both of which said blades overlap, said blades respectively being formed with openings; leading and trailing levers also carried by said support means for turning movement about said axis and respectively carrying pins which respectively extend into and substantially fill said openings so that said leading blade and lever turn together and said trailing blade and lever turn together; a pair of spring means urging said blades to their rest position; manually operable means operatively connected to said levers for turning them as a unit in a direction which displaces said blades also as a unit from said rest to said cocked position to maintain said blades in their overlapping relation and prevent an exposure aperture which is covered by said blades when in their rest position from being uncovered during movement of said blades to their cocked position, said manually operable means including blocking means associated with said trailing blade for movement together therewith, and for preventing movement of said trailing blade toward its rest position during movement of said blades to said cocked position thereof, said blocking means being arranged to release said trailing blade to the action of the corresponding one of said pair of spring means for movement toward said rest position thereof simultaneously with release of said leading blade to the action of the other of said pair of spring means; and retarding means automatically engaging only said trailing lever for retarding the turning thereof in a direction which returns said trailing blade to its rest position when said leading blade returns to its rest position so that the aperture will be uncovered during a period of time determined by said retarding means.

8. In a camera as recited in claim 7, said support means including a stationary plate extending between said levers, on the one hand, and said blades, on the other hand, said plate being formed with slots along which said pins freely move, respectively, during turning of said blades and levers about said axis.

9. In a camera, in combination, support means; leading and trailing blades turnably carried by said support means for angular movement about a predetermined axis between rest and cocked positions; leading and trailing levers also turnably carried by said support means for angular movement about said axis, said levers being respectively connected to said blades for turning the latter with said levers; a pair of spring means operatively connected to said levers for urging the latter and said blades to a rest position where said blades overlap each other and cover an exposure aperture of the camera; manually operable means engaging said levers for turning them as a unit in a direction which displaces said blades as a unit from said rest to said cocked position so that said blades maintain their overlapping relationship and do not uncover said aperture during turning of said blades to their cocked position, said manually operable means including blocking means associated with said trailing blade for movement together therewith, and for preventing movement of said trailing blade toward its rest position during movement of said blades to said cocked position thereof, said blocking means being arranged to release said trailing blade to the action of the corresponding one of said pair of spring means for movement toward said rest position thereof simultaneously with release of said leading blade to the action of the other of said pair of spring means; and retarding means automatically engaging only said trailing lever for retarding the return of only said trailing blade to its rest position when said leading blade returns from its cocked to its rest position to uncover the aperture for a time period determined by said retarding means.

10. In a camera, in combination, support means; leading and trailing blades turnably carried by said support means for angular movement about a common axis between rest and cocked positions; leading and trailing levers also turnably carried by said support means for angular movement about said axis and respectively connected to said leading and trailing blades for turning the latter with said levers; a pair of spring means respectively urging said blades from their cocked to their rest positions; manually operable means engaging said levers for turning them and said blades therewith as a unit to displace said blades from their rest position, in which they overlap each other and cover an exposure aperture, in opposition to said pair of spring means to a cocked position without uncovering said aperture and while maintaining said blades in their overlapping relationship, said manually operable means including a lug fixedly carried by said leading lever and engaging said trailing lever to transmit to the latter turning movement of said leading lever during displacement of said blades from said rest to said cocked positions, and to release said trailing lever and thereby said trailing blade to the action of its corresponding spring means when said leading lever moves back toward said cocked position thereof, a manually turnable lever carried by said support means, and a swing-lever turnably carried by said manually turnable lever and engaging said lug only during displacement of said blades to said cocked position, said swing-lever automatically riding off said lug when said blades reach said cocked position to release said leading blade for return by the respective spring means to its rest position and to thereby and simultaneously therewith release said trailing blade to the action of its respective spring means for return to its rest position; and retarding means automatically engaging only said trailing lever to retard only the return of said trailing blade to its rest position to provide an exposure time determined by said retarding means.

11. In a camera, in combination, support means; leading and trailing blades carried by said support means for angular movement about a common axis between rest and cocked positions; leading and trailing levers also carried by said support means for angular movement about said axis and respectively connected operatively to said blades for turning the latter with said levers; spring means urging said blades to return from said cocked to said rest positions; manually operable means engaging said levers for turning the latter and said blades therewith as a unit from said rest position, in which said blades overlap, to a cocked position without uncovering an exposure aperture which is covered by at least one of said blades in their rest position and while maintaining the overlapping relationship between said blades, said manually operable means including blocking means associated with said trailing blade for movement together therewith, and for preventing movement of said trailing blade toward its rest position during movement of said blades to said cocked position thereof, said blocking means being arranged to release said trailing blade to the action of said spring means for movement toward said rest position thereof simultaneously with release of said leading blade to the action of said spring means; and retarding means automatically engaging only said trailing lever when said leading lever and leading blade return to their rest position for retarding the return of said trailing lever and blade while said aperture is uncovered so as to provide a given exposure time, said retarding means including a rotary member supported for rotation by said support means, a pin carried by said rotary member for turning movement therewith, a portion of said trailing lever formed with a shoulder which is engaged by said pin so that in order to return to its rest position said trailing blade and lever must displace said pin and rotary member in a direction which displaces said pin from said shoulder, and a selecting means cooperating with said rotary member for determining the extent to which said pin moves along said shoulder before release of said trailing lever and blade for return from their cocked to their rest positions, so as to selectively determine the exposure time.

12. In a camera, in combination, support means; leading and trailing blades carried by said support means for angular movement about a common axis between rest and cocked positions; leading and trailing levers also carried by said support means for angular movement about said axis and respectively connected operatively to said blades for turning the latter with said levers; spring means urging said blades to return from said cocked to said rest positions; manually operable means engaging said levers for turning the latter and said blades therewith as a unit from said rest position, in which said blades overlap, to a cocked position without uncovering an exposure aperture which is covered by at least one of said blades in their rest position and while maintaining the overlapping relationship between said blades; and retarding means automatically engaging only said trailing lever when said leading lever and leading blade return to their rest position for retarding the return of said trailing lever and blade while said aperture is uncovered so as to provide a given exposure time, said retarding means including a rotary member supported for rotation by said support means, a pin carried by said rotary member for turning movement therewith, a portion of said trailing lever formed with a shoulder which is engaged by said pin so that in order to return to its rest position said trailing blade and lever must displace said pin and rotary member in a direction which displaces said pin from said shoulder, and a selecting means cooperating with said rotary member for determining the extent to which said pin moves along said shoulder before release of said trailing lever and blade for return from their cocked to their rest positions, so as to selectively determine the exposure time, said rotary member of said retarding means being in the form of a freely turnable mass, said retarding means including a spring which urges said mass to turn in the direction which displaces said pin toward said trailing lever, the latter having an arcuate edge extending along a circle whose center is in said axis and engaged by said pin until just before said trailing lever and trailing blade reach their cocked position, said shoulder being located at an end of said arcuate edge and engaging said pin just before said trailing lever and blade reach their cocked position, and said selecting means including a cam and a second pin carried by said mass and engaging said cam to determine the extent to which said first-mentioned pin moves along said shoulder at the end of the cocking of said blades, said cam being adjustable to determine the exposure time.

13. In a camera, in combination, support means; a pair of identical but oppositely directed blades turnably carried by said support means for angular movement about a common axis, one of said blades being a leading blade and the other being a trailing blade; leading and trailing levers also supported by said support means for angular movement about said axis and respectively connected to said leading and trailing blades for turning the latter with said levers; spring means urging said blades to a rest position where they overlap and cover an exposure aperture; manually operable means cooperating with said levers for turning the latter and said blades therewith as a unit from said rest to a cocked position while maintaining said aperture covered and said blades in said overlapping relation and for releasing said leading and trailing levers and said pair of blades therewith simultaneously from said cocked position of the latter to the action of said spring means; and retarding means automatically cooperating only with said trailing lever when said trailing blade is in its cocked position for retarding only the return of said trailing blade to its rest position while said spring means immediately returns said leading blade to its rest position to provide an exposure of a given exposure time.

14. In a camera as recited in claim 13, each of said blades being formed with a notch through which the exposure is made and the notch of one blade forming an extension of the notch of the other blade when said leading blade returns to its rest position while said trailing blade is maintained temporarily at its cocked position by said retarding means.

References Cited by the Examiner
UNITED STATES PATENTS

| | | | |
|---|---|---|---|
| 2,179,718 | 11/1939 | Fedotoff | 96—60 |
| 2,359,116 | 9/1944 | Johnson | 95—63 |
| 2,731,895 | 1/1956 | McKee | 95—60 |
| 3,099,197 | 7/1963 | Kiper | 95—63 |

JOHN M. HORAN, *Primary Examiner.*